Dec. 5, 1967     E. J. McGOWAN     3,356,791
ELECTRICAL INSULATOR WITH SERIALLY ARRANGED TRACKABLE AND
RELATIVELY TRACK-RESISTANT BODY PORTIONS
Filed Dec. 22, 1966

Inventor:
Edward J. McGowan,
by Paul R. Webb, II
His Attorney.

United States Patent Office 3,356,791
Patented Dec. 5, 1967

3,356,791
ELECTRICAL INSULATOR WITH SERIALLY ARRANGED TRACKABLE AND RELATIVELY TRACK-RESISTANT BODY PORTIONS
Edward J. McGowan, Sunnyvale, Calif., assignor to General Electric Company, a corporation of New York
Filed Dec. 22, 1966, Ser. No. 604,023
7 Claims. (Cl. 174—209)

ABSTRACT OF THE DISCLOSURE

An electrical insulator is composed of a trackable organic dielectric material, and a relatively track-resistant organic dielectric material on at least one portion of the surface of the trackable organic material. The relatively track-resistant material has a thickness in the direction of the potential gradient exceeding the scintillation distance. This latter material, which is characterized by depolymerization upon scintillation degradation without a substantial amount of carbonaceous residue, is selected from polytetrafluoroethylene, fluorinated ethylene propylene, polymethyl methacrylate, polyvinyl fluoride, and polyvinylidene fluoride. Both of the materials lie in series relation in the direction of the potential gradient.

---

This application is a continuation-in-part of my copending application Ser. No. 483,086, filed Aug. 27, 1965, now abandoned, and assigned to the same assignee as the present application.

In recent years organic resins, particularly those of synthetic origin, have been widely used in the fabrication of electrical insulators. Synthetic resins have proven eminently suitable for such insulator use in view of their high dielectric strength, ease of fabrication, and resistance to breakage. Many of those insulators have, however, suffered the notable deficiency of being subject to failure through "electrical scintillation," which is the gradual degradative erosion of a substantial portion of the surface of a dielectric material under the influence of many tiny arcs on the surface, which arcs occur generally from one electrode to the adjacent surface on the insulator surface. Such failure of organic insulators can occur at values significantly below dielectric breakdown voltages. For example, when organic insulators are employed on power transmission lines, accumulations of dust and moisture can settle on the insulators forming a plurality of isolated electrically conductive points on the surface of the insulator. When a high potential gradient exists across the insulator, a plurality of the above tiny arcs can be generated from the points of electrical conductivity on the insulator surface. These scintillations decompose the portion of the organic material they contact, thereby leaving carbonaceous deposits upon decomposition of the organic material and providing distinct conductive paths on the surface of the insulator. Such paths or tracks spread on the insulator surface until the potential across the insulator is short-circuited through a continuous carbonaceous conductive path.

The phenomenon of electrical scintillation can be distinguished from electrical "arcing" both as to the manner of taking place as well as to the type of failure resulting. Electrical arcing is a well-known phenomenon whereby an essentially continuous visible electrical discharge is produced between two points serving as electrodes with the path of the discharge generally proceeding away from the surface of the dielectric material. The path of such an electric discharge can also produce carbonization of organic dielectric materials, the latter phenomenon being commonly referred to as "tracking." By contrast, electrical scintillation is a phenomenon having the visual characteristics of many tiny discrete arcs (hereinafter referred to as "arclets"), which occur directly on the surface of the dielectric material, or between surface areas of lower conductivity separated by an area of higher conductivity on the dielectric material.

The reason for the different visual character of electrical scintillation, as compared to arcing, results from the causes which occasion the particular phenomena. Arcing results when sufficient electrical potential exists between the electrodes to exceed the dielectric breakdown strength of the interface between air and insulation surface. Electrical conduction proceeds in the surface of the dielectric material after it has been heated by its proximity to the extremely high temperatures of the arc discharge. For scintillation degradation to take place, it is not necessary that the dielectric breakdown strength of the interface between air and the insulation surface be exceeded. Scintillation degradation occurs with the presence of sufficient electrolytic impurities on the surface of the dielectric to form discrete areas of high electrical conductivity. The importance of the distinctions listed between the two phenomena is that scintillation occurs at much lower potentials between electrodes than is necessary for the occurrence of arcing.

The type of degradation of the dielectric material which scintillation causes also differs in another important manner from degradation due to arcing. Scintillation results in many small areas of surface degradation which can, by gradual linking, produce complete failure. Arcing causes rapid thermal degradation of the dielectric surface in close proximity to the arc. Complete destruction of the dielectric from scintillation can occur at voltages as low as $\frac{1}{15}$ of that necessary for arc discharge. It is also possible for the dielectric to be destroyed by fire from scintillation without arcing, if the particular dielectric affected is of a combustible nature.

The prevention of scintillation is an important problem. Not only can its effects be more disruptive to the operation of various electrical devices at the low voltage characteristics of service, but, as has been pointed out, since scintillation depends on electrical conduction through surface impurities, it may destroy some materials having good resistance to arcing. For example, melamine resin laminates are arc-resistant, but are nearly as susceptible to degradation by scintillation as are less arc-resistant paper base phenolic laminates. In view of the fact that otherwise arc-resistant dielectrics have been shown to be about as susceptible to scintillation degradation as less arc-resistant dielectrics, it would not be expected that the use of other dielectrics in conjunction with them would provide protection against scintillation.

In the copending application of Kenneth N. Mathes, Ser. No. 353,562, filed Mar. 20, 1964, there is disclosed and claimed a dielectric structure and a method for improving the resistance of such structure to electrical scintillation The above application is a continuation-in-part of his application Ser. No. 62,362, filed Oct. 31, 1960, and now abandoned. Both of these applications are assigned to the same assignee as the present application, which is directed to an improved electrical insulator.

It is an object of my invention to provide an improved electrical insulator which is resistant to electrical scintillation effects.

It is another object of my invention to provide an improved electrical insulator with a trackable organic dielectric material, a relatively track-resistant organic dielectric material on at least one portion of the surface of the trackable organic material, and both of the materials lie in series relation in the direction of the potential gradient.

It is another object of my invention to provide such an improved electrical insulator in which the relatively track-resistant material is characterized by depolymerization upon scintillation without a substantial amount of carbonaceous residue.

It is a further object of my invention to provide such an improved electrical insulator in which the strip of a relatively track-resistant material is selected from the class consisting of polytetrafluoroethylene, fluorinated ethylene propylene, polymethyl methacrylate, polyvinyl fluoride, and polyvinylidene fluoride.

It is a still further object of my invention to provide such an improved electrical insulator in which the relatively track-resistant material is in the closed configuration of a band.

In accordance with my invention, an electrical insulator comprises a trackable organic dielectric material, a relatively track-resistant organic dielectric material on at least one portion of the surface of the trackable organic material, the second material having a thickness in the direction of the potential gradient exceeding the scintillation distance, the second material characterized by depolymerization upon scintillation degradation without a substantial amount of carbonaceous residue, and both of the materials lying in series relation in the direction of the potential gradient.

These and various other objects, features and advantages of the invention will be better understood from the following description taken in connection with the accompanying drawing in which.

Figure 1:
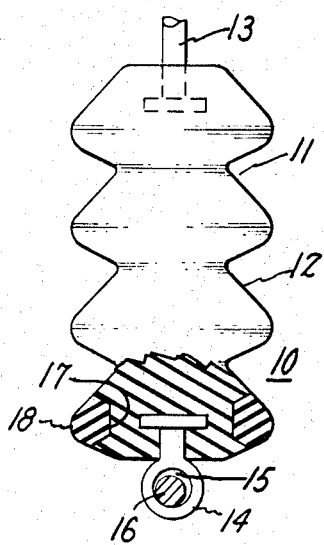
FIGURE 1 is a side elevational view partially in section of a hanging type electrical insulator embodying my invention.

Any organic dielectric material which can be decomposed by scintillation to produce electrically conductive carbonaceous deposits is considered to be a "trackable" material. The susceptibility of organic dielectrics to tracking varies widely and is generally unrelated to the dielectric breakdown strength of the material. Of commonly used electrically insulating material, aromatic resins such as phenolic resins are most prone to failure through tracking.

As used herein the term "relatively track-resistant" refers to materials having significantly less susceptibility to tracking than the materials to which they are compared. Aliphatic resins, for example, are generally less susceptible to tracking than aromatic resins; however, among aliphatic resins thermoplastic resins are generally relatively track-resistant as compared to thermosetting resins.

An electrical insulator includes generally a dielectric body extending between at least two points of differing potential. For example, the dielectric body of a power transmission line insulator is formed of a dielectric separating a support and a transmission line. The support and transmission line are in effect electrodes of differing potential attached to the insulator body.

I found unexpectedly that electrical insulator formed of a trackable organic dielectric material can be rendered less susceptible to electrical scintillation or tracking by providing a relatively track-resistant organic dielectric material on the surface of the trackable organic material. I discovered further that the relatively track-resistant organic dielectric material should be characterized by depolymerization upon electrical scintillation degradation without producing a substantial amount of carbonaceous residue. This latter material which is provided with a thickness in the direction of the potential gradient exceeding the scintillation distance, is placed in the carbonization path such that tracking is forced to proceed at a reduced rate along a circuitous route. This may be accomplished, for example, by providing an open helix or other deflecting surface of relatively track-resistant material on the surface of the first dielectric material. However, for most electrical insulator geometries, it is preferred that a closed strip or loop in the form of a band of relatively track-resistant material be positioned on the insulator surface separating the electrodes such that tracking cannot short-circuit the potential across the insulator without crossing this material.

Further, I found that at least one band of such material will accomplish the objects of my invention. Such a band is preferably positioned adjacent the higher potential end of the insulator. However, the band is also suitably used adjacent the other end or approximately at the mid-point of the electrical insulator. A further improvement in scintillation resistance employs such a band adjacent each end of the insulator.

For maximum effectiveness, the dimensions of the track-resistant materials in the direction of the potential gradient should, of course, exceed the distance traversed by scintillations, that is, the flashover distance. Flashover distances varying with humidity and voltage are published for various insulator geometries by Underwriters' Laboratories. Both the trackable and track-resistant materials lie in series relation in the direction of the potential gradient.

A distinct advantage of my invention is that it can be used to increase the scintillation resistance or track-resistance of insulators formed largely of trackable organic dielectric materials. By employing an electrical insulator formed of a cheap and structurally strong trackable organic dielectric in combination with such a relatively track-resistant surface portion, the track-resistance of the surface portion can be obtained for the entire structure without the corresponding disadvantages in cost and structural properties.

My invention is particularly well suited to upgrading the track-resistance of conventional electrical insulators formed with trackable organic dielectric materials. In such instances, it might be desirable to remove a portion of the trackable insulative material and to replace the trackable material with relatively track-resistant material of the above types. Alternately, the track-resistant material is cast around the trackable material. In other instances, it is adhesively, resiliently, or mechanically attached to the body of a trackable insulator.

In FIGURE 1 of the drawing, a hanging type electrical insulator is shown generally at 10. This insulator is composed substantially of a trackable organic dielectric material 11 with four integral skirts 12 thereon. An upper supporting element 13 and a lower supporting element 14 are shown imbedded in material 11 at opposite ends thereof. Element 14 is provided with an eye 15 through which an electrical conductor 16 can be passed. Thus, upper support element 13 and lower support element 14 are in effect electrodes of differing potential attached to the insulator. At the lower end, the higher potential end, of material 11, an annular groove 17 is provided in the exterior surface of bottom skirts 12. A single band 18 of relatively track-resistant organic dielectric material is fitted in groove 17. In this manner, both the trackable material 11 and the track-resistant material 18 lie in series relation in the direction of the potential gradient between support elements 13 and 14. Track-resistant material 18 is shown in its preferred arrangement lying adjacent the higher potential end of insulator 10.

Material 18 has a thickness in the direction of the potential gradient exceeding the scintillation distance. Further, this material is characterized by depolymerization upon scintillation without a substantial amount of carbonaceous residue. It is preferred to select material 18 from the class consisting of polytetrafluoroethylene, fluorinated ethylene propylene, polymethyl methacrylate, polyvinyl fluoride, and polyvinylidene fluoride.

Figure 2:
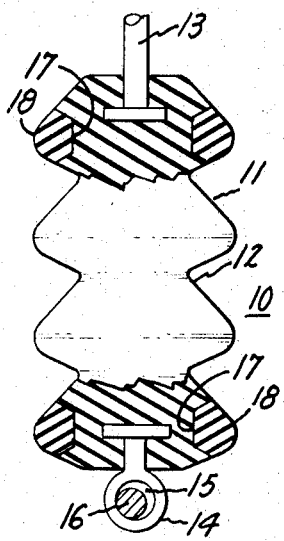
FIGURE 2 is a side elevational view partially in section of a modified hanging type electrical insulator.
Figure 3:
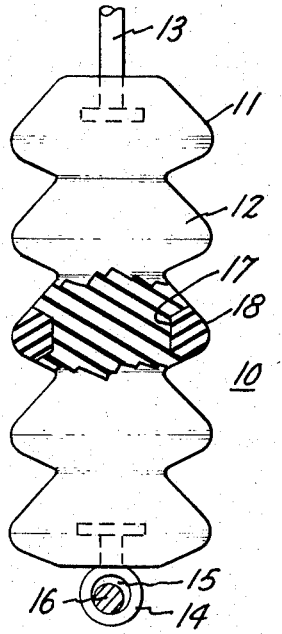
FIGURE 3 is a side elevational view partially in section of another modified hanging type of electrical insulator.

FIGURES 2 and 3 shown modified electrical insulators which are similar to the hanging type electrical insulator of FIGURE 1. However, in FIGURE 2 a groove 17 is provided in both the top and bottom skirts of material 11. A band 18 of relatively non-trackable material is then fitted into each of these grooves. In this manner, additional protection is provided against scintillation by the uppermost band 18 adjacent the end of the insulator, which is at the lower potential. In FIGURE 3, groove 17 is provided in the middle skirt of insulator material 11. A band 18 of relatively track-resistant material is positioned in that groove. Effective scintillation resistance is provided by this configuration.

Figure 4:
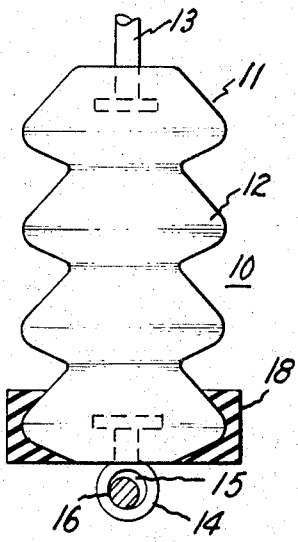
FIGURE 4 is a vertical section of an alternate form of a hanging type insulator.

In FIGURE 4, there is shown an insulator similar to the insulator in FIGURE 1. However, band 18 of relatively track-resistant material is shown cast around the bottom skirt 12 of the insulator. In this arrangement, no groove is necessary for band 18.

Figure 5:
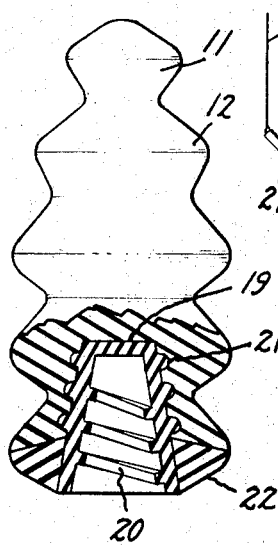
FIGURE 5 is a side elevational view partially in section of an up-right type electrical insulator embodying my invention.

In FIGURE 5, there is shown an up-right type electrical insulator. A support receiving element 19 is provided with a plurality of threads 20 on its interior surface and a plurality of protuberances 21 on its exterior surface. An insulator substantially of material 11 with a plurality of skirts 12 thereon is molded onto the upper portion of the exterior surface of element 19. Protuberances 21 provide a positive mechanical bond between element 19 and material 11. A band 22 of relatively track-resistant material identical with material 18 is positioned around the lower portion of the exterior surface of element 19. Thus, band 22 is positioned adjacent the lower edge of the insulator.

Figure 6:
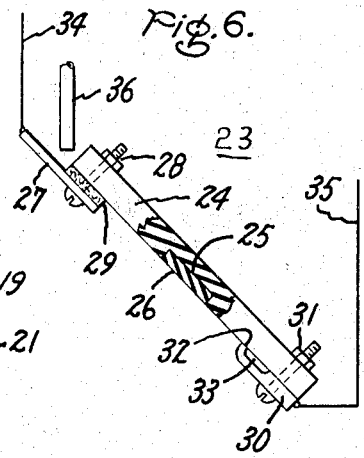
FIGURE 6 is a sectional view of a testing apparatus.

In FIGURE 6, there is shown apparatus 23 for testing the invention set forth above. Apparatus 23 has an electrical insulator comprising a trackable organic dielectric material 24 in the form of a piece of paper-phenolic resin laminate 2½ x ½ x 5 inches. A slot 25 was provided across the center to a depth of 1/16 inch and a width of ½ inch. A relatively track-resistant organic dielectric material 26 was provided in the form of a methyl methacrylate resin strip 2½ x ½ x 1/16 inches, which was bonded in slot 25 using a synthetic resin adhesive. Laminate 24 provided with methyl methacrylate strip 26 bonded in slot 25 was attached to a first electrode 27 by a bolt-assembly 28. A layer of filter paper 29 was placed between laminate 24 and electrode 27. At the lower end of the laminate, an electrode 30 was attached to the laminate by a bolt-assembly 31. The upper end of electrode 30 was provided with teeth 32 to form a fluid passage 33 between the electrode 30 and laminate 24. Electrical leads 34 and 35, schematically shown, were attached to the electrodes 27 and 30, respectively. A fluid conduit 36 was provided to supply fluid to filter paper 29. The test apparatus was similar to that disclosed by Mathes and McGowan, "Surface Electrical Failure in the Presence of Contaminants: The Inclined-Plane Liquid-Contaminant Test," published July 1961, in Communications and Electronics.

The following example of an electrical insulator made in accordance with my invention is as follows:

The above insulator shown in FIGURE 6 and described above was prepared and tested. An aqueous solution containing 0.1 percent ammonium chloride and 0.2 percent of a wetting agent was supplied to filter paper 29 through fluid conduit 36 at a rate of 0.15 cc./min. A voltage of 1.75 kv. was initially placed across electrodes 27 and 30. Tracking commenced at electrode 30 at the end of 30 seconds and spread toward the strip.

At the end of 10 minutes, hot spots appeared on top of methyl methacrylate strip 26. After 30 minutes, the voltage was raised to 2 kv. After one hour, the voltage was raised to 2.25 kv. Thereafter, the voltage was raised ¼ kv. at the end of each half-hour period. The electrical insulator failed by burning at 3.75 kv.

The following example is of an electrical insulator without relatively track-resistant organic dielectric material on at least one portion of the surface of the trackable organic dielectric material.

The above insulator shown in FIGURE 6 and described above was prepared with the following changes. Paper-phenolic resin laminate 24 was used but no slot 25 was formed, and no methyl methacrylate strip 26 was used. The insulator was tested as described above. Failure through tracking occurred at 1.5 kv.

While other modifications of the invention and variations thereof which may be employed within the scope of the invention have not been described, the invention is intended to include such as may be embraced within the following claims.

What I claim as new and desire to secure by Letters Patent of the United States is:

1. An electrical insulator comprising a trackable organic dielectric material, a relatively track-resistant organic dielectric material on at least one portion of the surface of the trackable organic material, the second material having a thickness in the direction of the potential gradient exceeding the scintillation distance, the second material characterized by depolymerization upon scintillation degradation without a substantial amount of carbonaceous residue, and both of the materials lying in series relation in the direction of the potential gradient.

2. The electrical insulator as in claim 1, in which the second material is selected from the class consisting of polytetrafluoroethylene, fluorinated ethylene propylene, polymethyl methacrylate, polyvinyl fluoride, and polyvinylidene fluoride.

3. The electrical insulator as in claim 2, in which the second material is in the form of a band.

4. The electrical insulator as in claim 3, in which the band lies adjacent one end thereof.

5. The electrical insulator as in claim 3, in which the band lies at approximately the mid-point of the insulator.

6. The electrical insulator as in claim 2, in which the second material is in the form of a pair of bands lying adjacent opposite ends thereof.

7. The electrical insulator as in claim 2, in which the second material is in the form of a plurality of bands.

References Cited

UNITED STATES PATENTS

| | | | |
|---|---|---|---|
| 1,717,281 | 6/1929 | Thomson | 174—209 |
| 1,764,434 | 6/1930 | Cochran | 174—179 |
| 1,911,803 | 5/1933 | Burns | 174—209 X |
| 2,897,386 | 7/1959 | Jones | 174—209 X |
| 3,098,894 | 7/1963 | Sprigings | 174—209 X |

LARAMIE E. ASKIN, *Primary Examiner.*